(12) United States Patent
Kang et al.

(10) Patent No.: US 11,245,481 B2
(45) Date of Patent: Feb. 8, 2022

(54) CROSS-LINK INTERFERENCE AVOIDANCE METHODS AND SIGNALING IN NR DYNAMIC TDD

(71) Applicant: Telefonaktiebolaget LM Ericsson (publ), Stockholm (SE)

(72) Inventors: Du Ho Kang, Upplands Väsby (SE); Havish Koorapaty, Saratoga, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 43 days.

(21) Appl. No.: 16/616,740

(22) PCT Filed: Jun. 5, 2018

(86) PCT No.: PCT/SE2018/050582
§ 371 (c)(1),
(2) Date: Nov. 25, 2019

(87) PCT Pub. No.: WO2018/231127
PCT Pub. Date: Dec. 20, 2018

(65) Prior Publication Data
US 2021/0152261 A1 May 20, 2021

Related U.S. Application Data

(60) Provisional application No. 62/520,689, filed on Jun. 16, 2017.

(51) Int. Cl.
*H04B 17/345* (2015.01)
*H04B 17/336* (2015.01)
(Continued)

(52) U.S. Cl.
CPC ......... *H04B 17/345* (2015.01); *H04B 17/336* (2015.01); *H04L 5/0048* (2013.01); *H04L 5/14* (2013.01)

(58) Field of Classification Search
CPC ... H04B 17/345; H04B 17/336; H04L 5/0048; H04L 5/14
See application file for complete search history.

(56) References Cited

U.S. PATENT DOCUMENTS

| 9,119,097 B2 * | 8/2015 | Chatterjee | H04W 72/042 |
| 2014/0126403 A1 * | 5/2014 | Siomina | H04J 11/005 370/252 |

(Continued)

FOREIGN PATENT DOCUMENTS

WO 2013170471 11/2013

OTHER PUBLICATIONS

International Search Report and Written Opinion dated Sep. 11, 2018, issued in PCT Application No. PCT/SE2018/050582, consisting of 14 pages.

(Continued)

*Primary Examiner* — Duc C Ho
(74) *Attorney, Agent, or Firm* — Christopher & Weisberg, P.A.

(57) ABSTRACT

The invention relates to a method for operating a network node in a wireless network. The method includes detecting cross-link interference on one or more time slots used when communicating with the network node, identifying an aggressor node generating the detected cross link interference, and transmitting, to the aggressor node, a signal having an indication of slot number and/or a transmission direction of the detected cross link interference.

10 Claims, 15 Drawing Sheets

(51) Int. Cl.
  *H04L 5/00* (2006.01)
  *H04L 5/14* (2006.01)

(56) References Cited

U.S. PATENT DOCUMENTS

2016/0286432 A1\* 9/2016 Centonza ............. H04J 11/0056
2017/0013632 A1   1/2017 Bercovich et al.

OTHER PUBLICATIONS

RI-1702113; CATT: Interference management for dynamic TDD and flexible duplex, 3GPP Draft; 3rd Generation Partnership Project (3GPP), Mobile Competence Centre ; 650, Route Des Lucioles ; F-06921 Sophia-Anti Polis Cedex France vol. RAN WGI, No. Athens, Greece; Feb. 13, 2017-Feb. 17, 2017; consisting of 3 pages.
RI-1612562; Interference Detection and Reporting, 3GPP Draft; Dynamic TDD Detection, 3rd Generation Partnershi P—Project (3GPP), Mobi Le Competence Centre ; 650, Route Des Lucioles ; F-06921 Sophia-Anti Polis Cedex France vol. RAN WGI, No. Reno, USA; Nov. 14, 2016-Nov. 18, 2016; consisting of 3 pages.

\* cited by examiner

CROSS-LINK INTERFERENCE AVOIDANCE METHODS AND SIGNALING IN NR DYNAMIC TDD

CROSS-REFERENCE TO RELATED APPLICATIONS

This application is a Submission Under 35 U.S.C. § 371 for U.S. National Stage Patent Application of International Application No.: PCT/SE2018/050582, filed Jun. 5, 2018 entitled "CROSS-LINK INTERFERENCE AVOIDANCE METHODS AND SIGNALING IN NR DYNAMIC TDD," which claims priority to U.S. Provisional Application No. 62/520,689, filed Jun. 16, 2017, entitled "CROSS-LINK INTERFERENCE AVOIDANCE METHODS AND SIGNALING IN NR DYNAMIC TDD," the entireties of both of which are incorporated herein by reference.

TECHNICAL FIELD

The present invention relates to a method for operating a network node in a wireless network. The invention further relates to a method for operating a device in a wireless network.

BACKGROUND

New radio (NR) is the radio interface for fifth generation of wireless networks (5g). NR design is based on a flexible structure where any time domain resource for transmission can be allocated for DownLink (DL) or UpLink (UL) or a combination of both. If the DL and UL transmission occur on different carriers, it resembles Frequency Division Duplex (FDD) type of operation in e.g. LTE. However, if UL and DL transmissions occur on the same carrier it resembles Time Division Duplex (TDD) type of operation in LTE.

The flexible design of resource allocation in NR, in particular for time resources, is sometimes referred to as Dynamic TDD operation. This enables NR to maximally utilize available radio resources in the most efficient way for both traffic or transmission directions, e.g. UL and DL. The traditional LTE technology only supports static TDD where time domain resources are split between downlink and uplink based on a long-term configuration. One drawback with static TDD is that it can be very inefficient, particularly when only one traffic direction exists since the other dedicated time resources for the other direction is wasted or not used.

Although dynamic TDD brings significant performance gain at low to medium loads, the performance benefits become smaller as the traffic load increases due to the cross-link interference. Handing this cross-link interference at high load is one of the most important tasks in order to ensure gains from dynamic TDD operation at higher loads.

Conventional solutions attempts to minimize the cross-link interference by defining signaling schemes between APs. However, this solution has the drawbacks of signaling overhead and required complexity in the equipment.

Thus, there is a need for an improved method for cross-link interference management.

OBJECTS OF THE INVENTION

An objective of embodiments of the present invention is to provide a solution which mitigates or solves the drawbacks described above.

SUMMARY OF THE INVENTION

The above and further objectives are achieved by the subject matter described herein. Further advantageous implementation forms of the invention are described herein.

According to a first aspect of the invention, the above mentioned objectives are achieved by a method for operating a network node in a wireless network, the method comprises detecting cross-link interference, CLI, on one or more time slots used when communicating with the network node, identifying an aggressor node generating the CLI, transmitting, to the aggressor node, a signal comprising an indication of slot number and/or a transmission direction of the detected CLI.

At least one advantage of this aspect of the disclosure is that signaling overhead and required complexity in the equipment can be reduced.

According to a second aspect of the invention, the above mentioned objectives are achieved by a method for operating a user equipment in a wireless network, the method comprises obtaining a measurement configuration, receiving a first reference signal, transmitting a message comprising information based on the received first reference signal.

According to a third aspect of the invention, the above mentioned objectives are achieved by a wireless device comprising processing circuitry configured to perform any of the steps according to the second aspect; and power supply circuitry configured to supply power to the wireless device.

According to a fourth aspect of the invention, the above mentioned objectives are achieved by a base station comprising processing circuitry configured to perform any of the steps according to the first aspect; and power supply circuitry configured to supply power to the wireless device.

According to a fifth aspect of the invention, the above mentioned objectives are achieved by a user equipment, UE, comprising an antenna configured to send and receive wireless signals; radio front-end circuitry connected to the antenna and to processing circuitry, and configured to condition signals communicated between the antenna and the processing circuitry; the processing circuitry being configured to perform any of the steps according to the first aspect, an input interface connected to the processing circuitry and configured to allow input of information into the UE to be processed by the processing circuitry; an output interface connected to the processing circuitry and configured to output information from the UE that has been processed by the processing circuitry and a battery connected to the processing circuitry and configured to supply power to the UE.

According to a sixth aspect of the invention, the above mentioned objectives are achieved by a communication system including a host computer comprising processing circuitry configured to provide user data; and a communication interface configured to forward the user data to a cellular network for transmission to a user equipment, wherein the cellular network comprises a base station having a radio interface and processing circuitry, the base station's processing circuitry configured to perform any of the steps according to the first aspect.

According to a seventh aspect of the invention, the above mentioned objectives are achieved by a method implemented in a communication system including a host computer, a base station and a user equipment the method comprising at the host computer, providing user data; and at the host computer, initiating a transmission carrying the user data to the UE via a cellular network comprising the base station, wherein the base station performs any of the steps according to the first aspect.

According to an eighth aspect of the invention, the above mentioned objectives are achieved by a user equipment, UE, configured to communicate with a base station, the UE comprising a radio interface and processing circuitry configured to perform any of the method steps according to the sixth aspect.

According to a ninth aspect of the invention, the above mentioned objectives are achieved by a communication system including a host computer comprising processing circuitry configured to provide user data; and a communication interface configured to forward user data to a cellular network for transmission to a user equipment, UE, wherein the UE comprises a radio interface and processing circuitry, the UE's components configured to perform any of the steps according to the second aspect.

According to a tenth aspect of the invention, the above mentioned objectives are achieved by a method implemented in a communication system including a host computer, a base station and a user equipment, UE, the method comprising at the host computer, providing user data; and at the host computer, initiating a transmission carrying the user data to the UE via a cellular network comprising the base station, wherein the UE performs any of the steps according to the first aspect.

According to an eleventh aspect of the invention, the above mentioned objectives are achieved by a communication system including a host computer comprising communication interface configured to receive user data originating from a transmission from a user equipment, UE to a base station, wherein the UE comprises a radio interface and processing circuitry, the UE's processing circuitry configured to perform any of the steps according to the second aspect.

According to a twelfth aspect of the invention, the above mentioned objectives are achieved by a method implemented in a communication system including a host computer, a base station and a user equipment, UE, the method comprising at the host computer, receiving user data transmitted to the base station from the UE, wherein the UE performs any of the steps according to the second aspect.

According to a thirteenth aspect of the invention, the above mentioned objectives are achieved by a communication system including a host computer comprising a communication interface configured to receive user data originating from a transmission from a user equipment, UE, to a base station, wherein the base station comprises a radio interface and processing circuitry, the base station's processing circuitry configured to perform any of the steps according to the second aspect.

According to a fourteenth aspect of the invention, the above mentioned objectives are achieved by a method implemented in a communication system including a host computer, a base station and a user equipment UE, the method comprising at the host computer, receiving, from the base station, user data originating from a transmission which the base station has received from the UE, wherein the UE performs any of the steps according to the second aspect.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly

Figure 1:
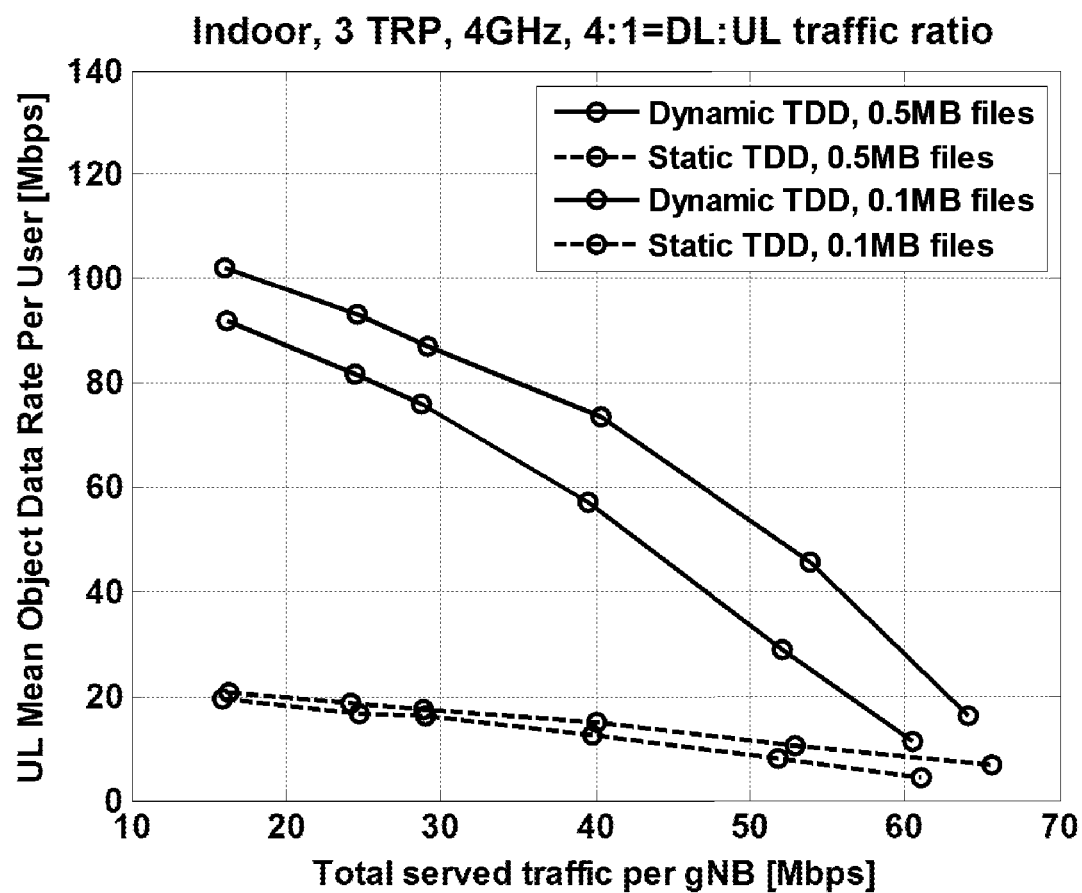
FIG. 1: shows Dynamic TDD performance benefit in NR compared to traditional fixed TDD operation in LTE.

A more complete understanding of embodiments of the invention will be afforded to those skilled in the art, as well as a realization of additional advantages thereof, by a consideration of the following detailed description of one or more embodiments. It should be appreciated that like reference numerals are used to identify like elements illustrated in one or more of the figures.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

New radio (NR) is the radio interface for fifth generation of wireless networks (5g). NR design is based on a flexible structure where any time domain resource for transmission can be allocated for DownLink (DL) or UpLink (UL) or a combination of both. If the DL and UL transmission occur on different carriers, it resembles Frequency Division Duplex (FDD) type of operation in e.g. LTE. However, if UL and DL transmissions occur on the same carrier it resembles Time Division Duplex (TDD) type of operation in LTE. Due to the built-in flexible design in NR, the NR operation is sometimes referred to as Dynamic TDD operation. This enables NR to maximally utilize available radio resources in the most efficient way for both traffic directions, e.g. UL and DL. The traditional LTE technology only supports static TDD where time domain resources are split between downlink and uplink based on a long-term configuration. This can be very inefficient, particularly when only one traffic direction exists since the other dedicated time resource for the other direction is wasted.

NR operation based on dynamic TDD, in particular, will bring significant performance gain at the low to medium load compared to the traditional fixed TDD in LTE as shown in FIG. 1. This is true since dynamic TDD may be considered to not have any restriction on the usage of radio resource in a certain time period.

FIG. 1: shows Dynamic TDD performance benefit in NR compared to traditional fixed TDD operation in LTE. Different legends represent a different file size and Tx/Rx Point, TRP, is the same terminology as the traditional eNB in LTE. The scenario for evaluation of performance is NR indoor open office with 3 TRPs.

There currently exist certain challenge(s) within the field of wireless communication. In the following disclosure we use "Access point" to indicate a node that supports communications to one or more wireless devices or User equipment (UEs). An access point is to be considered as generic terminology that represents any kind of node, e.g., a gNB in a 5G NR network as being specified in 3GPP. Although dynamic TDD brings significant performance gain at low to medium loads, the performance benefits become smaller as the traffic load increases due to the cross-link interference.

Figure 2A:
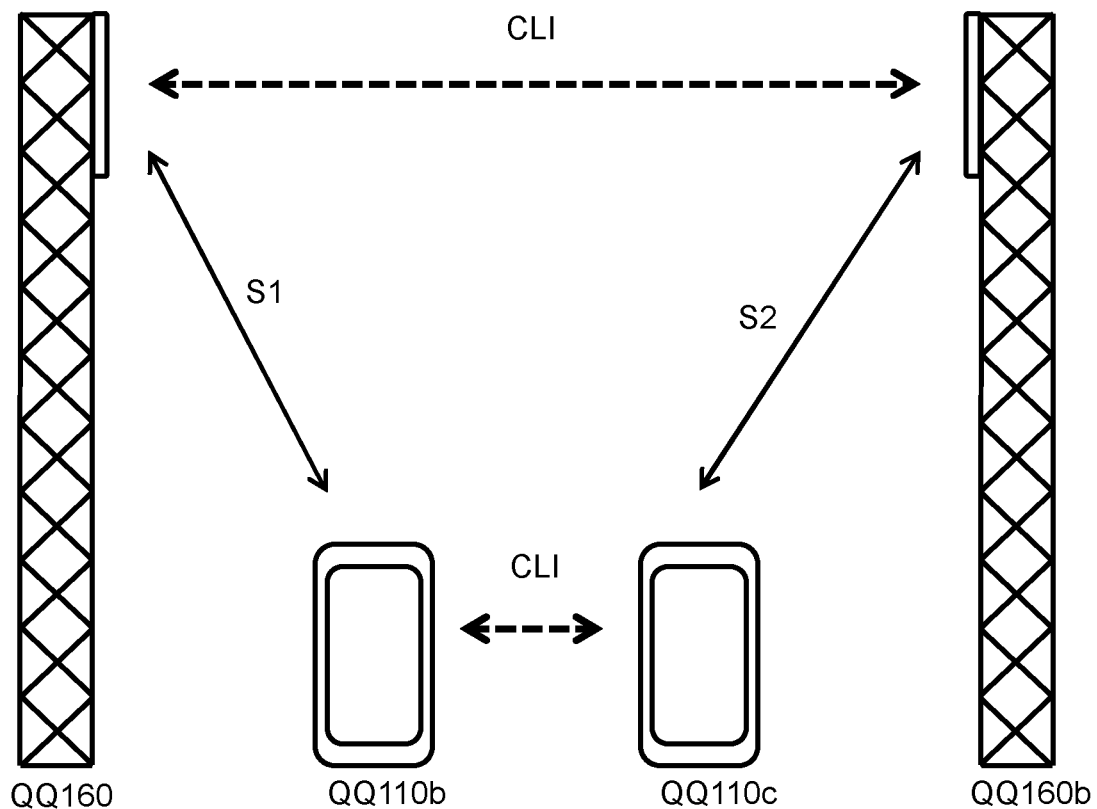
FIG. 2 illustrates the cross-link interference, CLI, problem, e.g. in a NR or 5g wireless network.

FIG. 2A illustrates the cross-link interference, CLI, problem, e.g. in a 5G NR network. As shown in FIG. 2A, if two cells have different traffic directions, e.g. UE1 QQ110$b$ operating in downlink transmission direction may experience very strong cross-link interference from UE2 QQ110$c$ operating in uplink transmission direction, which can be closer to UE1 than the serving AP1 (Access point 1) QQ160. From AP2 QQ160$b$ in uplink perspective, AP2 QQ160$b$ may also experience cross-link interference from AP1 QQ160 since AP1 QQ160 is transmitting. Handing this cross-link interference at high load is one of important tasks in order to ensure gains from dynamic TDD operation at higher loads. This is the reason that in FIG. 1, dynamic TDD performance is getting similar to static TDD. The simplest solution to minimize the cross-link interference can be defining signaling between APs. However, real-time signaling usually requires overhead and complexity in the equipment used. Therefore, a more intelligent solution for cross-link interference management without inter-cell signaling is required.

Figure 2B:
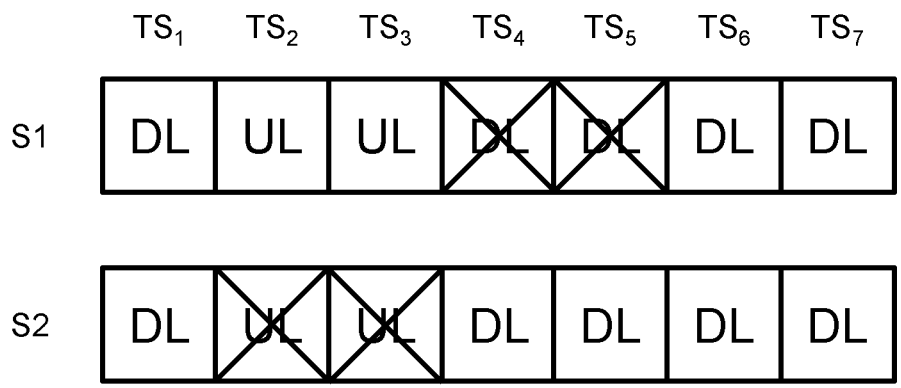

FIG. 2B illustrates the cross-link interference, CLI, between time slots. Time slots are time resources used when communicating between any of the base stations QQ160, QQ160$b$ and/or UEs QQ110$b$, QQ110$c$. With reference to FIG. 2A, a first signal S1 is exchanged between a first base station QQ160 and UE1 QQ110$b$ operating alternatively in downlink and uplink transmission direction, signified with "UL" and "DL" in FIG. 2B. A second signal S2 is exchanged between a second base station QQ160$b$ and UE2 QQ110$c$ operating alternatively in downlink and uplink transmission direction.

In one example shown in FIG. 2B, both UE1 QQ110$b$ and UE2 QQ110$c$ are operating in uplink transmission direction during the time slots $TS_2$ and $TS_3$. CLI is then generated for S2 during the time slots $TS_2$ and $TS_3$, thus the base station QQ160$b$ can be seen as a victim base station and/or cell. In one further example shown in FIG. 2B, both the first base station QQ160 and the second base station QQ160$b$ are operating in the downlink transmission direction during the time slots $TS_4$ and $TS_5$. CLI is then generated for S1 during the time slots $TS_4$ and $TS_5$, thus the base station QQ160 can be seen as a victim base station and/or cell and the base station QQ160$b$ can be seen as an aggressor victim base station and/or cell.

One may consider a fully distributed interference management method without inter-cell signaling and measurement methods in order to employ dynamic switching between static duplex and flexible duplex. The dynamic switching may be done based on e.g. a buffer status and presence or absence of bi-directional traffic.

A condition to switch based on buffer status may end up to be too conservative in some scenarios. For example, if due to the presence of the bi-direction traffic, a node switches to a static TDD pattern to minimize the cross-link interference but due a distribution of APs and/or UEs and/or nodes, the nodes are far apart that they will not interfere with each other. That results in unnecessary throughput reduction.

One way to alleviate this, it could be considered a solution where a switch between dynamic TDD and static TDD is based on a presence or absence of bidirectional traffic as well as measurements made at the UE and/or the AP.

This invention teaches triggering conditions and new signaling to avoid cross-link interference with considerations of user scheduling aspects.

Certain aspects of the present disclosure and their embodiments may provide solutions to these or other challenges.

The methods proposed in the invention or present disclosure in order to manage cross-link interference can be categorized as follows In a first aspect of the present disclosure, methods are based on control of user scheduling in the victim cell and triggers for exercising such control of scheduling.

This may involve to exclude users from being scheduled in the next T transmission time intervals, TTI, if any one or any combination of the following triggering conditions are met A number of errors in the previous N transmissions exceed a certain threshold.

A signal-to-interference-plus-noise ratio, SINR, is greater than a certain threshold in the last N transmissions.

A difference in SINR at time t and t+delta is greater than a certain threshold.

The interference level at the UE exceeds a certain threshold.

In a second aspect of the present disclosure, methods are based on user scheduling in the aggressor cell, new signaling to the aggressor cell, and triggers for exercising such control of scheduling in the aggressor cell including:

Signaling on the backhaul, information of the slot or subframe number and direction of transmission to/from the victim user Cross-link aggressor identification and control via scheduling based on the received information via backhaul signaling including the following techniques Checking the received slot/subframe number and transmission direction in or from the victim cell Checking transmission direction on the indicated slot/subframe to decide whether cross-link interference was generated by the aggressor cell If cross-link interference was generated by the aggressor cell on the reported slot/subframe number, identify the user scheduled and exclude that user in next T transmission time intervals In a third aspect of the present disclosure, methods are based on measurements in the victim cell to identify the aggressor identity, signaling of the identified aggressor, scheduling in the aggressor cell to control the interference and triggers for exercising such control of scheduling in the aggressor cell including:

Identification of aggressor nodes with measurements at the UE on Demodulation Reference Signal DMRS, Sounding Reference Signal SRS or other Reference Signals RS.

Distribution of identified interferers based on detected RS codes via signaling between cells over the backhaul Checking in receiving cells to determine via the signaled RS codes whether they are generating the dominant interference. There are, proposed herein, various embodiments which address one or more of the issues disclosed herein.

In one embodiment, a method according to the second or third aspect is provided for operating a network node QQ160 in a wireless network, the method comprises:

detecting cross-link interference, CLI, on one or more time slots $TS_1$-$TS_7$ used when communicating with the network node QQ160. The CLI may be detected using measurements in the network node QQ160 and/or UE/WD QQ110b, e.g. using triggering conditions further disclosed above in relation to the first aspect. The measurements may be configured to be periodic or event driven, as would be understood by a person skilled in the art.

identifying an aggressor node QQ160b generating the detected cross link interference, CLI. In one example, this may be performed by identifying the cell identity or cell ID of the aggressor node QQ160b.

transmitting, to the aggressor node QQ160b, a signal comprising an indication of slot number and/or a transmission direction of the detected cross link interference.

In one embodiment, the transmission direction when communicating with the network node QQ160 is uplink or downlink.

In one embodiment, the detecting of cross-link interference on a time slot of the one or more time slots is based on evaluating one or more of the triggering conditions:

a number of measured errors of the previous N transmissions on the time slot exceeds a first threshold, a measured SINR in the last N transmissions on the time slot is greater than a second threshold, a difference in measured SINR between subsequent transmissions on the time slot is greater than a third threshold a measured interference level measured at the UE on the time slot exceeds a fourth threshold.

In one embodiment, a method according to the second or third aspect for operating a user equipment QQ110, QQ200 in a wireless network is provided. The method comprises:

obtaining a measurement configuration. The measurement configuration may be received comprised in control signaling from the network node QQ160 and may indicate a reference signal codes and/or time/frequency resource/s.

receiving a first reference signal. The first reference signal may be a reference signal from the aggressor node QQ160b.

transmitting a message comprising information based on the received first reference signal. In one example, the message is transmitted from the user equipment QQ110, QQ200 to the network node QQ160 and indicates the reference signal of the aggressor node QQ160b.

In one embodiment, the message comprises an indication of a reference signal code.

In one embodiment, the measurement configuration indicates a set of reference signal codes and/or a time-frequency resource.

In one embodiment, obtaining may comprise receiving from a network node QQ160 and/or reading from a device readable medium QQ180.

In one embodiment, the method further comprises correlating the first received reference signal with reference signal codes from the set of reference signal codes to identify a first reference signal code.

In one embodiment, the first reference signal is received on using the set of reference signal codes and/or the indicated time-frequency resource.

In one embodiment, the method further comprises correlating the first received reference signal with reference signal codes from the set of reference signal codes to identify a first reference signal code, e.g. of the aggressor node QQ160b.

In one embodiment, wherein the first reference signal code is associated with a reference signal contributing most to a power of the first received reference signal.

In one embodiment, wherein each reference signal code of the set of reference signal codes are associated with at least one of a Sounding Reference Signal SRS, a Demodulation and Reference Signal DMRS and a Cell Specific Reference Signal CRS.

In one embodiment, the message comprises an indication of a the first reference signal code, and/or the message is transmitted to the network node (QQ160).

Certain embodiments may provide one or more of the following technical advantage(s). The following advantages have been identified:

In NR TDD operation, the proposed solution can reduce cross-link interference

In NR TDD operation, the proposed solution can at the end enhance downlink and uplink performance significantly by reducing erroneous transmission caused by the cross-link interference provided that existing flexibility in scheduling direction in dynamic TDD operation is still maintained.

Embodiments herein may facilitate identifying of aggressor nodes and thereby enable interference mitigation. As can be realized, reduced interference generally provides for the further advantage of increased data rates.

Additional Explanation

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the following we describe different methods for managing cross-link interference which combines information based on measurements made by UEs or gNBs, signaling on the backhaul based on the measurements and simple user scheduling adjustments made by the cells in which measurements are performed and the detrimental effects of cross-link interference is perceived (victim cell) and/or by the cells which generate cross-link interference to other cells (aggressor cells).

In the following embodiments, the corresponding measurements, e.g. of CLI, can be done only at the AP without considering any measurements at UE. Alternatively, the AP can use the measurement reports from the UE or the combination of measurements both done at the UE and APs. Moreover, in the case of multiple measurements results existing, a combination or aggregation of those results can be considered to determine a measurement value or result that can be used for a decision, e.g. to detect CLI. The multiple measurements can refer to the multiple measurements from the multiple UEs and/or AP and/or measurements reported at different time instances or different measurements made in the same slot. All or part of multiple measurements can be aggregated to define one cell level measurement value.

Examples of such combination or aggregation can be to determine the average or the first N maximum or minimum values of multiple measurement results from multiple UEs and/or AP. Another case is considering measurement results only from nodes which require radio resources, i.e. with data in the buffer. The multiple measurements from multiple time instances from single UE or AP can be also moving-averaged with a forgetting factor.

In the following embodiments, the measurements are used to make user scheduling decisions that can reduce cross-link interference and improve performance. In some cases, new signaling over the backhaul is used or foreseen.

In the embodiments, whenever a threshold is used, e.g. to detect CLI, the threshold type and value depends on the type of measurements and the corresponding threshold value can be fixed or adjustable. The threshold value can change based on different parameters. Some examples are listed below that can be used to adjust the threshold:

The threshold can be changed based on the end users' system throughput with indication of gradual degradations.

The threshold can be changed based on the number of active nodes, e.g. UEs.

The threshold can be changed based on the transmit power.

The threshold can be changed based on the measurements record, e.g., based on recording of the level of interference over some period of time.

The threshold can be changed based on the link adaptations records or the statistics of erroneous transmission The threshold can be changed based on the weighted sum of the number of users with different QoS classes.

In embodiments according to the first aspect, methods are based on control of scheduling in the victim cell and triggers for exercising such control of scheduling In this embodiment, users served by the victim cell are excluded from being scheduled in the next T transmission time intervals if any one or the combination of the following triggering conditions are met:

A number of errors, such as a Block Error Rate BER, in the previous N transmissions exceeds a certain threshold.

A SINR is greater than a certain threshold in the last N transmissions.

A difference in SINR at time t and time t+delta is greater than a certain threshold. In other words, SINR changes more over time than a threshold value.

An interference level at the UE exceeds a certain threshold.

In embodiments according to the second aspect methods are based on scheduling in the aggressor cell, signaling to the aggressor cell, and triggers or triggering conditions for exercising such control of scheduling in the aggressor cell.

In this embodiment, signaling on the backhaul is used to convey information of the slot or subframe number and direction of transmission to/from the user that experienced severe interference as per any of the criteria or triggering conditions listed in relation to embodiments according to the first aspect.

When the signaling is received in the neighboring cells, the gNBs serving these cells use the information to identify potential transmissions in their own cell that may be generating the cross-link interference. This is done by checking the received slot/subframe number and direction from the victim cell and checking transmission directions for transmissions scheduled in its cell in the indicated slot/subframe. If cross-link interference was generated by the aggressor cell on the reported slot/subframe number, the user scheduled is identified and that user is excluded in next T transmission time intervals.

In embodiments according to the third aspect methods are based on measurements in the victim cell to identify the aggressors identity, signaling of the identified aggressor, scheduling in the aggressor cell to control the interference and triggers for exercising such control of scheduling in the aggressor cell.

In this embodiment, the techniques in the previous embodiment are used but with some additional information provided by the measurements performed in the victim cell. The measurements are performed so as to be able to identify the aggressor identity.

In other words, in addition to the what is described in embodiments according to the second aspect, an aggressor cell identity is detected or determined and signaled to the aggressor cell. This may be achieved by performing measurements, for instance, on reference signals such as Demodulation Reference Signal DMRS, Sounding Reference Signal SRS or other Reference Signals RS. The identified interferers are distributed e.g., by signaling the detected RS codes to neighboring cells, such as the aggressor cell, over the backhaul. The gNBs in these cells then can check to determine whether they are generating the dominant interference by verifying if the reported interfering RS or other signals were generated from that cell in the reported slot/subframe number.

In embodiments according to a fourth aspect, carrier switching and scheduling patterning are applied.

In this embodiment, another way of scheduling the victim or aggressor user is provided instead of excluding the user during a certain time. Given that carrier aggression is used or configured in the cell, the victim or aggressor user can be scheduled in another or different carrier as long as the other carrier does not fulfill the above mentioned triggering conditions presented in relation to the first aspect of the disclosure. Also, it is possible to schedule the victim or aggressor user in a predetermined pattern of slots instead of excluding it for scheduling, if the dominant cross link interference pattern is or can be identified. The repetition can be identified based on the slot index with different conditions. As a non-limiting example, gNB can decide dominant cross-link interference occurs every X time slot based on the identification of slot index with errors or SINR exceeding a certain threshold or aggregation interference level exceeding a certain threshold. Then, the scheduling pattern of the victim or aggressor user can be chosen to avoid the dominant interference pattern.

Figure 3:
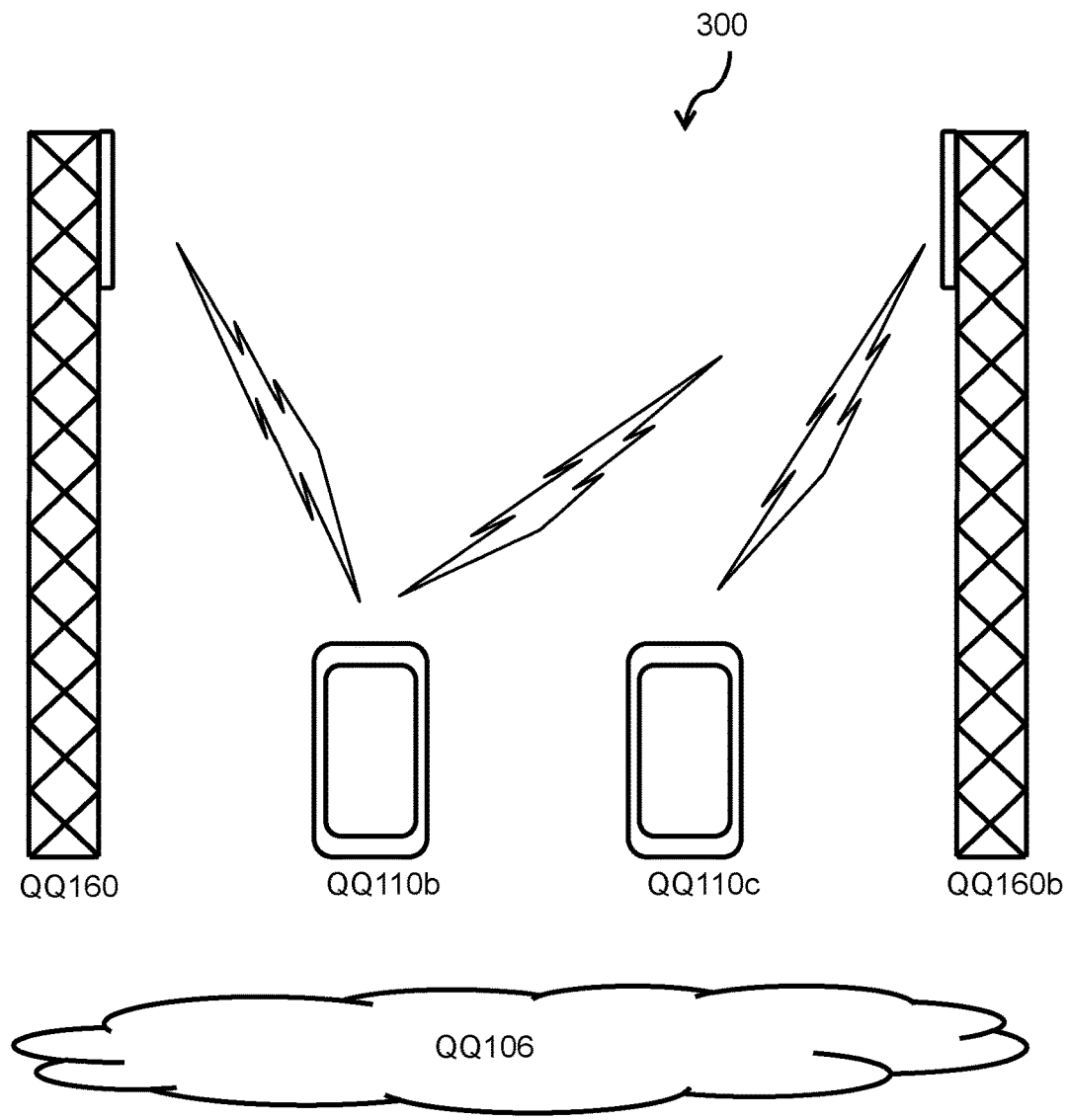
FIG. 3 shows a wireless network in accordance with some embodiments.

FIG. 3 shows a wireless network in accordance with some embodiments of the present disclosure Although the subject matter described herein may be implemented in any appropriate type of system using any suitable components, the embodiments disclosed herein are described in relation to a wireless network, such as the example wireless network 300 illustrated in FIG. 3. For simplicity, the wireless network of FIG. 3 only depicts network QQ106, base stations/network nodes QQ160 and QQ160b, and wireless Devices WDs or UEs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device, WD, QQ110 are depicted with additional detail in FIGS. 4 and 5 respectively. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Figure 4:
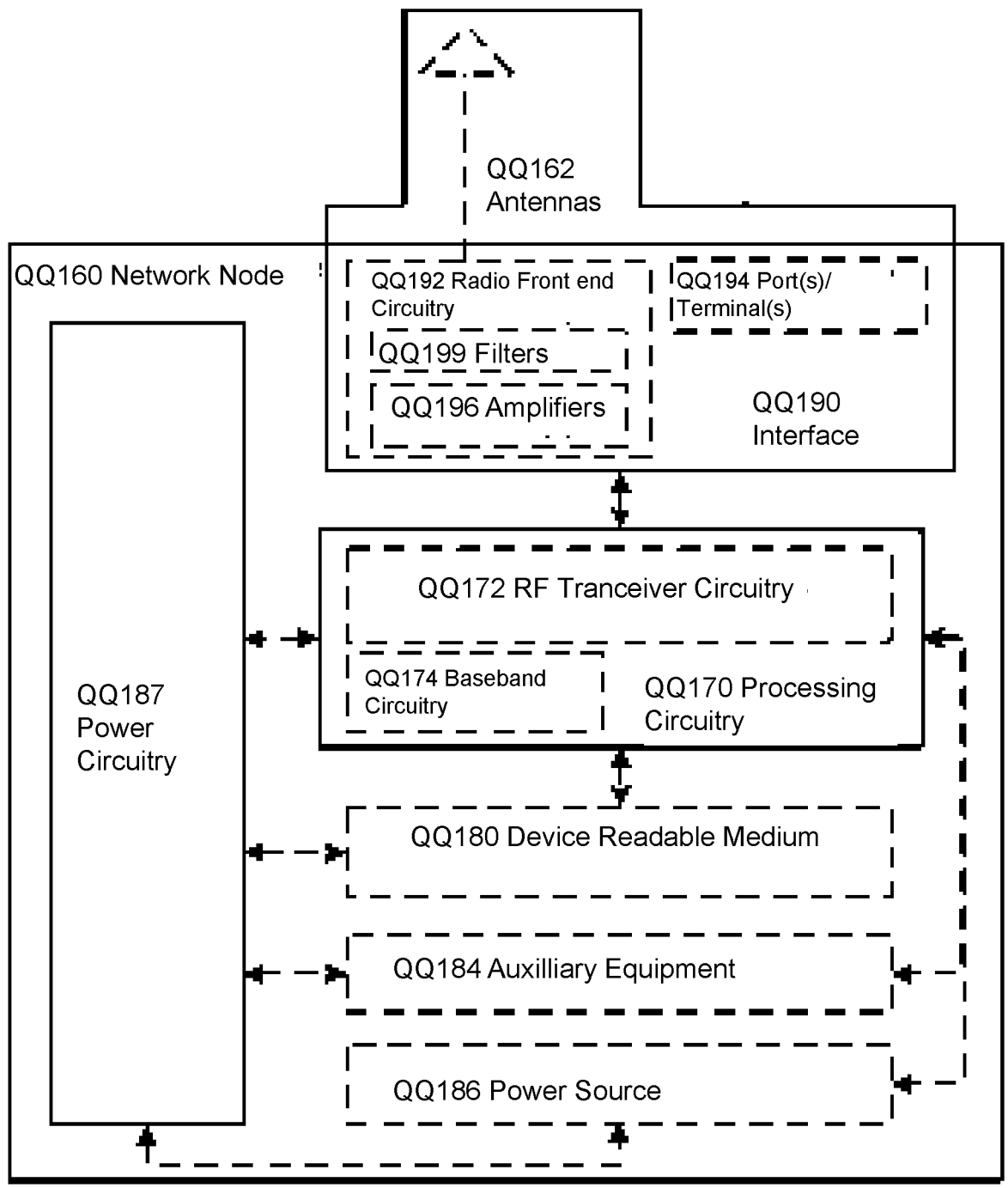
FIG. 4 shows details of a network node in accordance with some embodiments.
Figure 5:
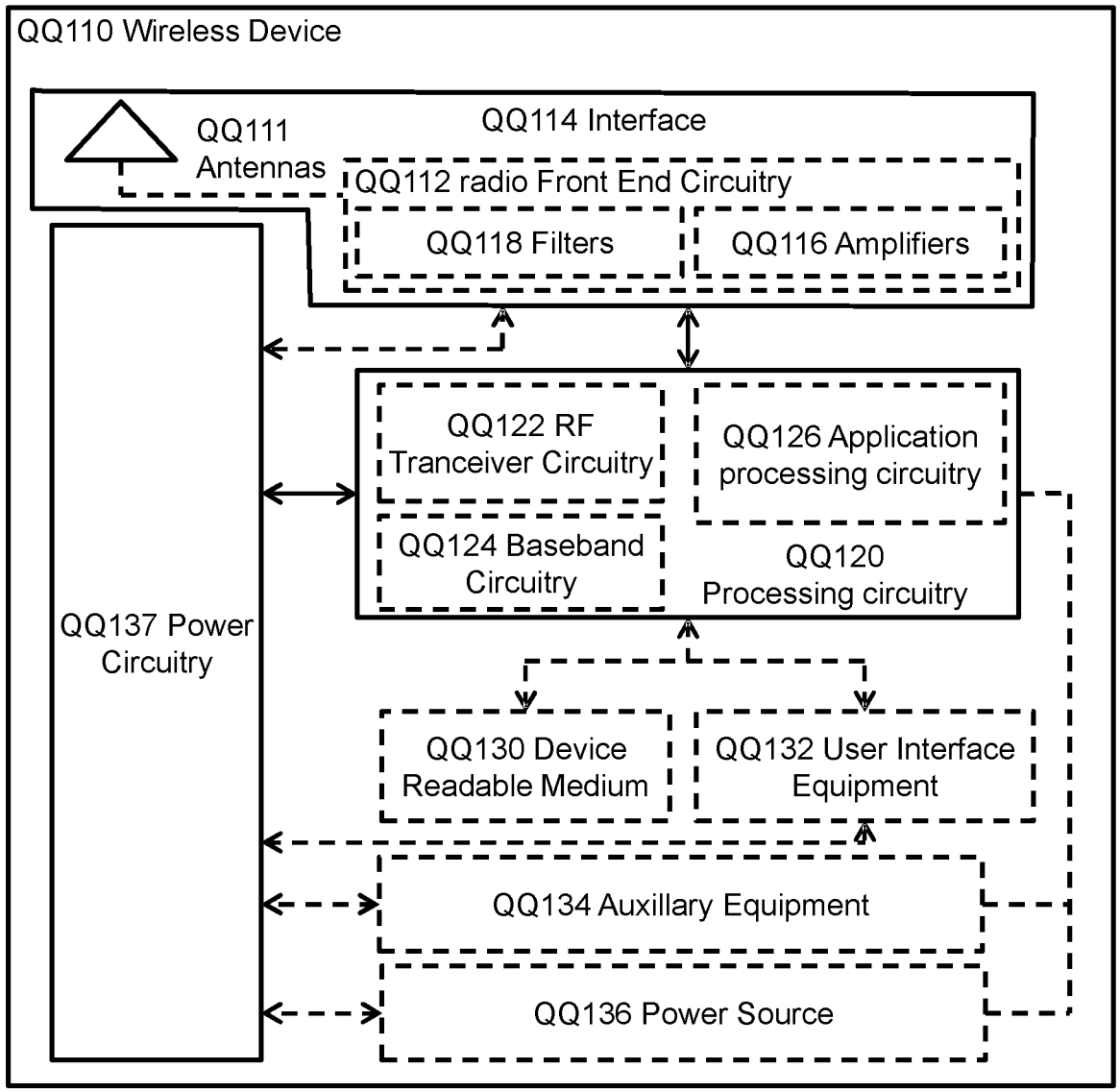
FIG. 5 shows details of a wireless device in accordance with some embodiments.

Network node QQ160 and WD QQ110 comprise various components described in more detail in FIGS. 4 and 5. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, base station/network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

FIG. 4 shows details of a network node QQ160 according to one or more embodiments. In FIG. 4, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. QQ1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 4 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

FIG. 5 shows details of a wireless device QQ110 according to one or more embodiments. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 6:
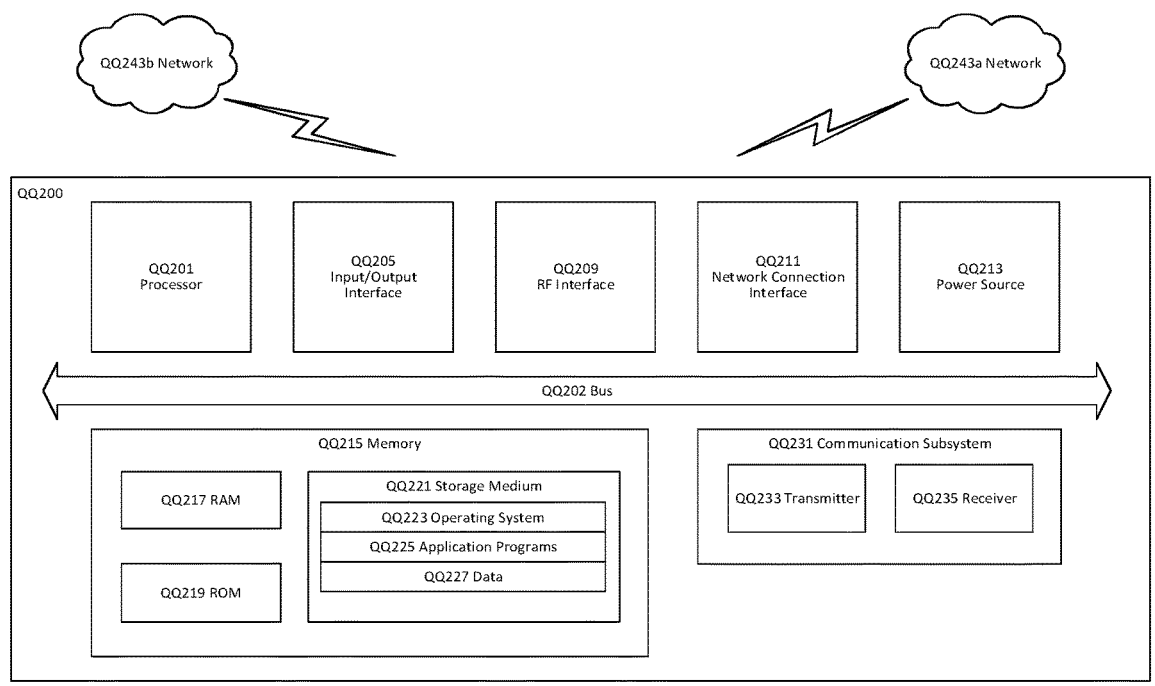
FIG. 6 shows components of a User Equipment in accordance with some embodiments.

FIG. 6 shows components of a User Equipment QQ200 according to one or more embodiments. FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3rd Generation Partnership Project (3GPP), including a NB-IoT UE that is not intended for sale to, or operation by, a human user. UE QQ200, as illustrated in FIG. 6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. QQ2 is a UE, the components discussed herein are equally applicable to a WD, and vice-versa.

In FIG. 6, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 6 QQ2, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 6, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 7:
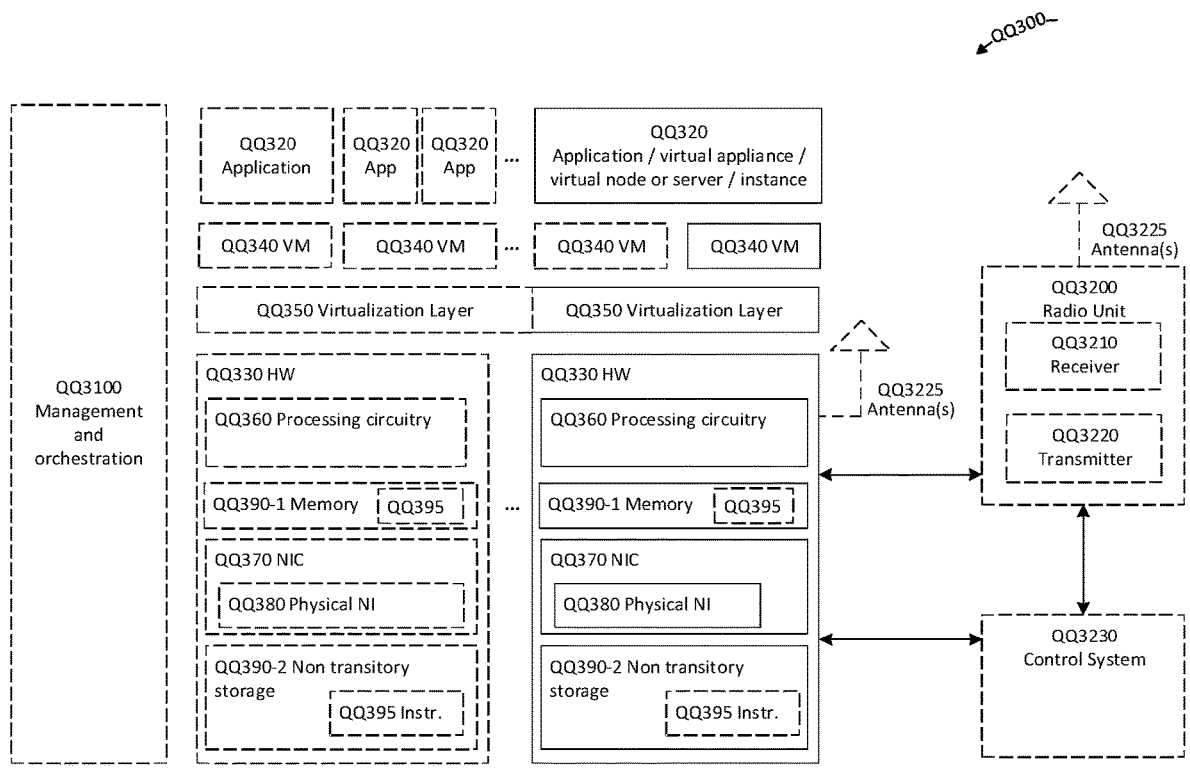
FIG. 7 illustrates a virtualization environment in accordance with some embodiments.

FIG. 7 illustrates a virtualization environment QQ300 in accordance with some embodiments.

FIG. 7 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 8:
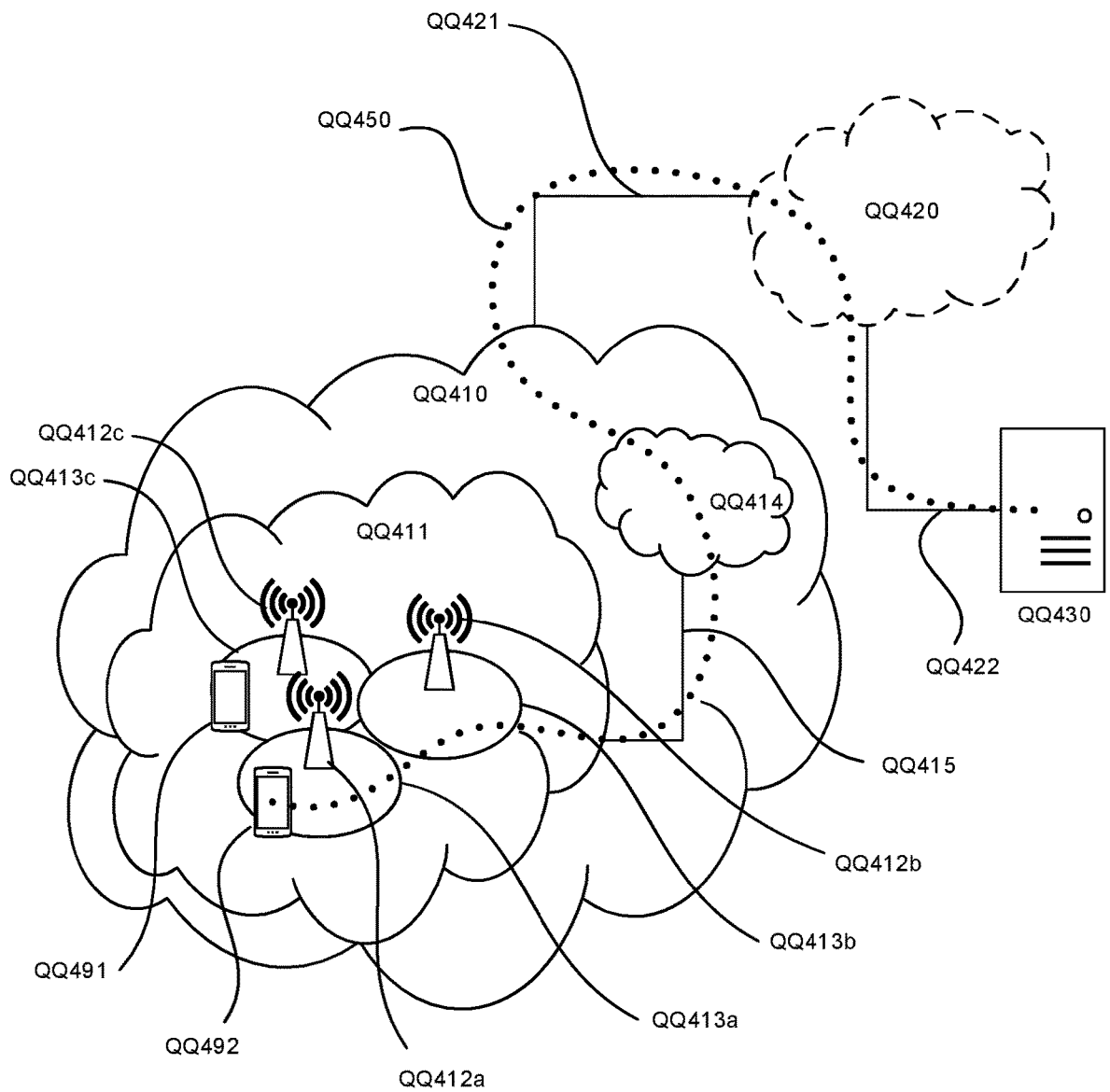
FIG. 8 shows a telecommunication network connected via an intermediate network to a host computer in accordance with some embodiments.

FIG. 8 shows a telecommunication network connected via an intermediate network to a host computer in accordance with some embodiments.

With reference to FIG. 8, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 8 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 9:
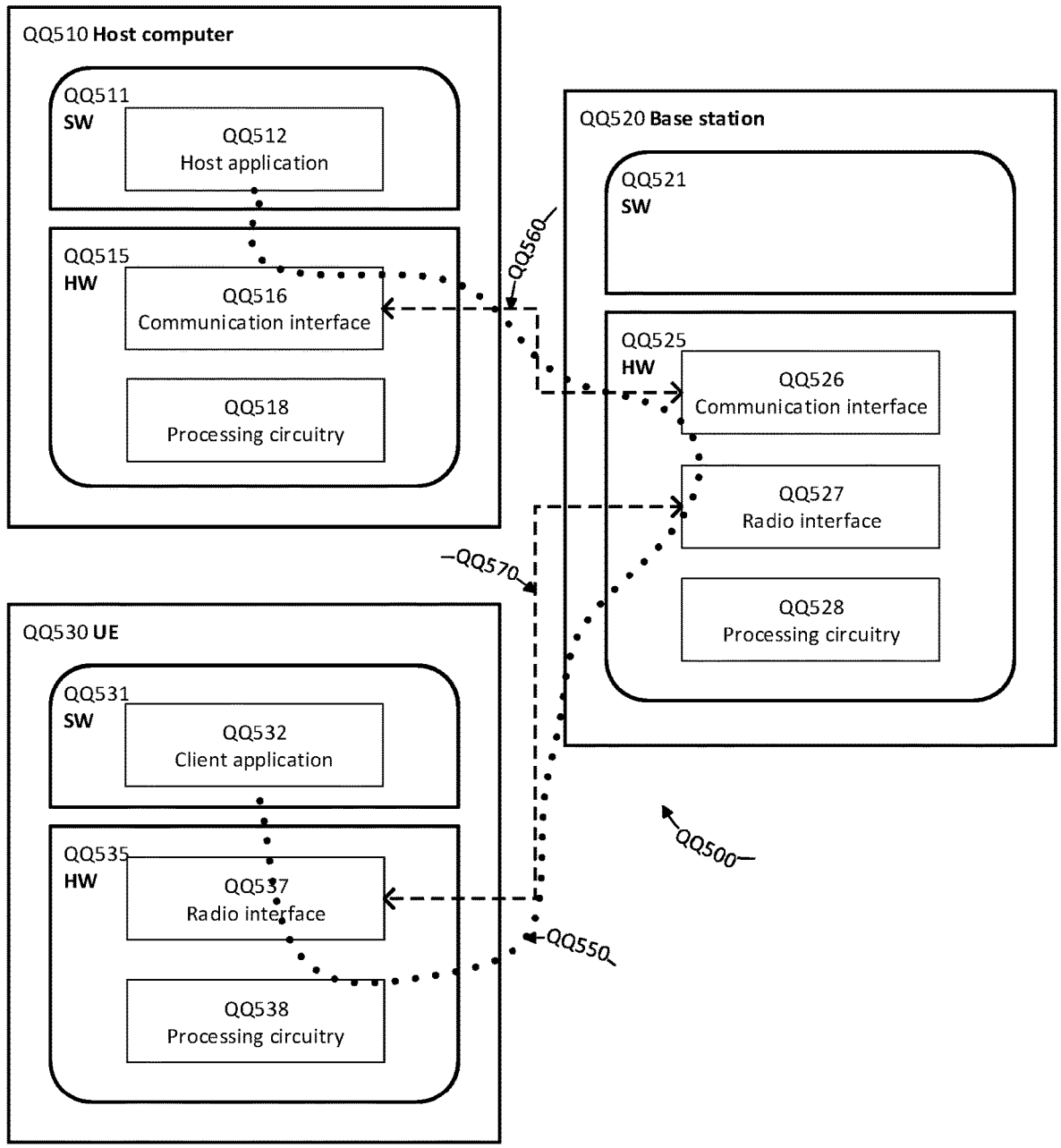
FIG. 9 shows a host computer communicating via a base station with a user equipment over a partially wireless connection in accordance with some embodiments.

FIG. 9 shows a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 9. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. QQ5) served by base station QQ520. Communication interface QQ526 may be configured to facilitate connection QQ560 to host computer QQ510. Connection QQ560 may be direct or it may pass through a core network (not shown in FIG. QQ5) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 9 may be similar or identical to host computer QQ430, one of base stations QQ412a, QQ412b, QQ412c and one of UEs QQ491, QQ492 of FIG. QQ4, respectively. This is to say, the inner workings of these entities may be as shown in FIG. 9 and independently, the surrounding network topology may be that of FIG. 8.

In FIG. 9, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve the data rate by reducing and/or mitigating interference and thereby provide benefits such as reduced user waiting time.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 10:
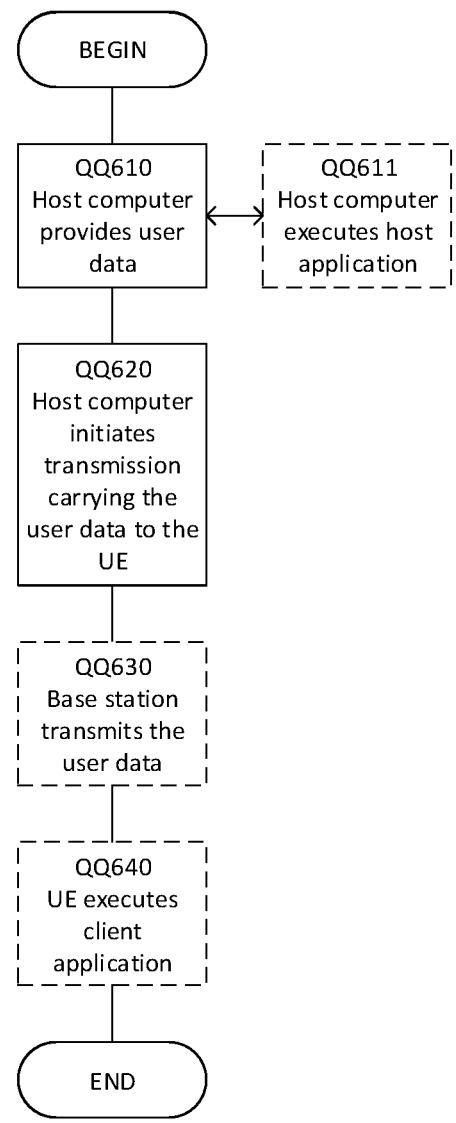
FIG. 10 illustrates a flowchart of a method in accordance with some embodiments.

FIG. 10 illustrates a flowchart of a method in accordance with one or more embodiments. FIG. 10 shows methods implemented in a communication system including a host computer, a base station and a user equipment in accordance with some embodiments. FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 11:
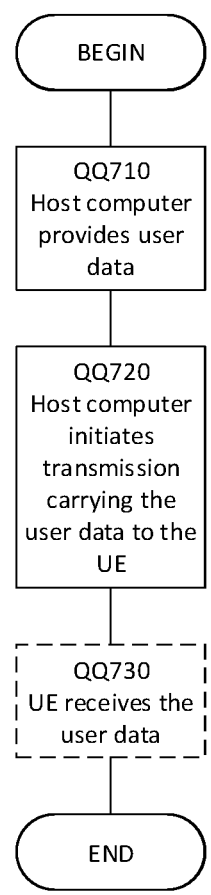
FIG. 11 shows methods implemented in a communication system including a host computer, a base station and a user equipment in accordance with some embodiments

FIG. 11 shows methods implemented in a communication system including a host computer, a base station and a user equipment in accordance with some embodiments FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 12:
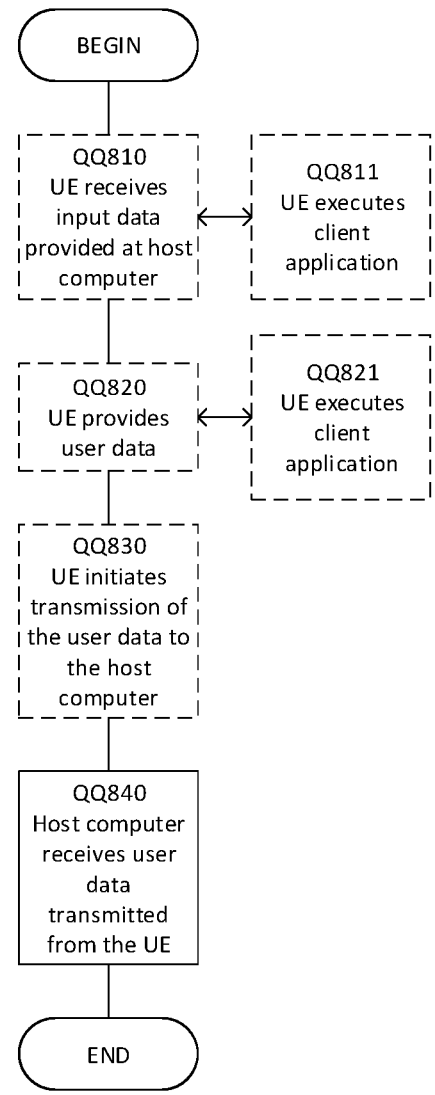
FIG. 12 shows methods implemented in a communication system including a host computer, a base station and a user equipment in accordance with some embodiments

FIG. 12 shows methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 13:
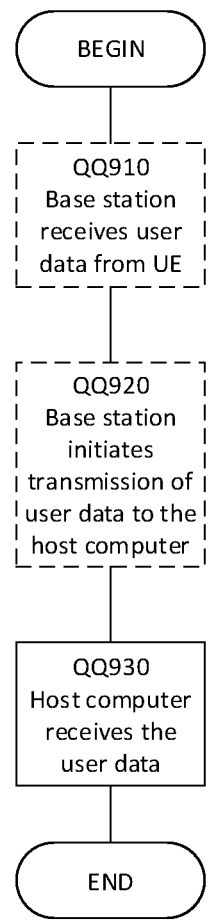
FIG. 13 shows methods implemented in a communication system including a host computer, a base station and a user equipment in accordance with some embodiments

FIG. 13 shows methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Figure 14:
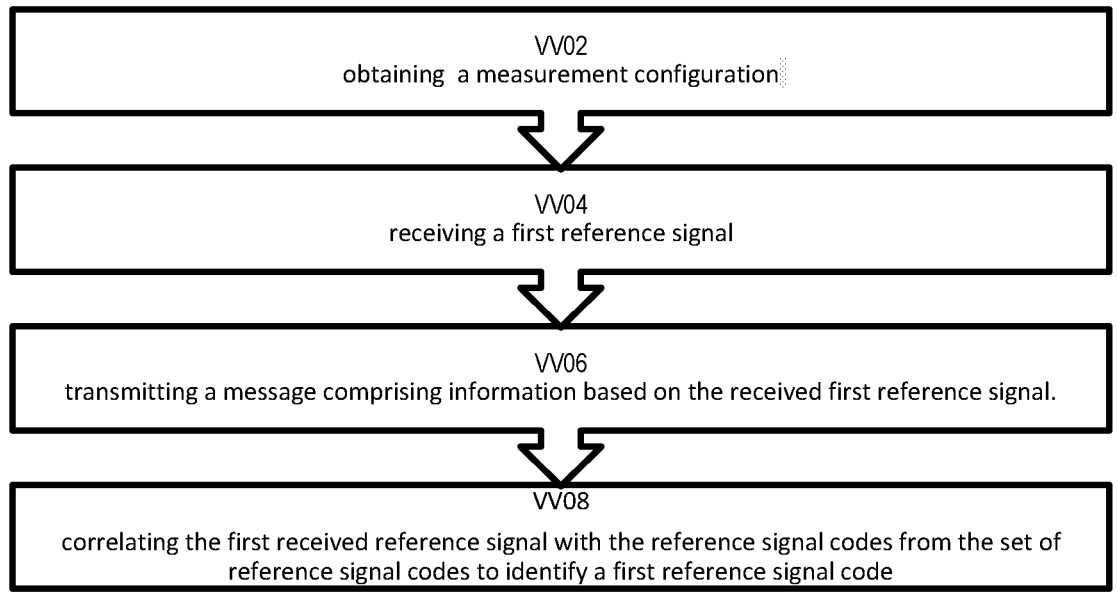
FIG. 14 depicts a method in accordance with particular embodiments.

FIG. 14 depicts a method in accordance with particular embodiments, the method begins at step VV02 with obtaining a measurement configuration.

Figure 15:
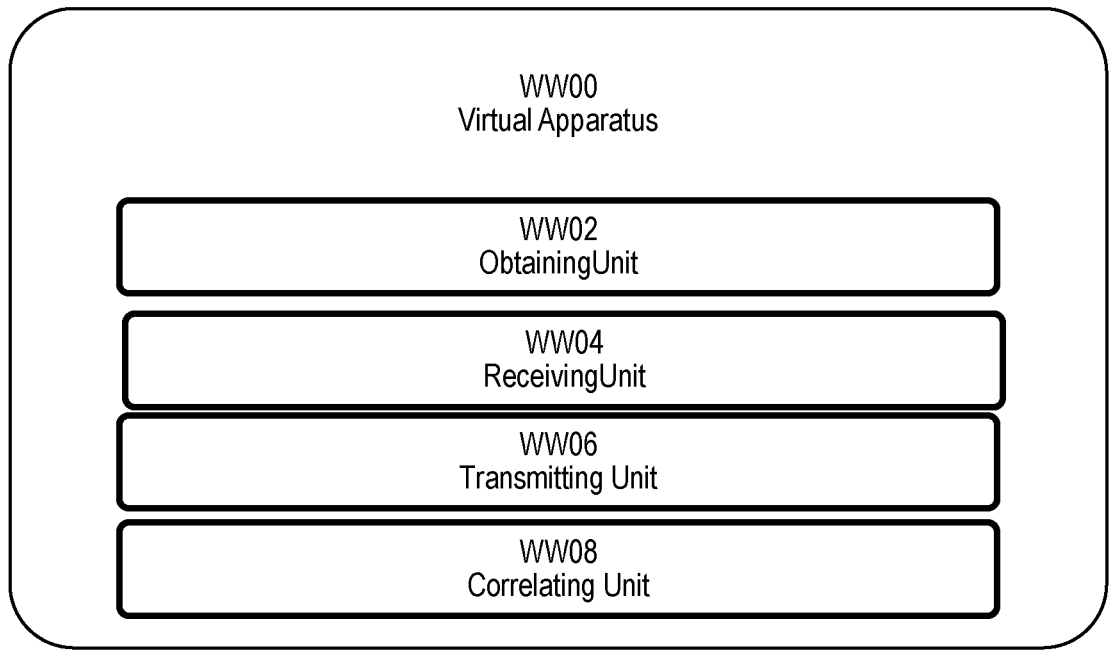
FIG. 15 illustrates a schematic block diagram of an apparatus WW00 in a wireless network in accordance with particular embodiments.

FIG. 15: Virtualization apparatus in accordance with some embodiments

FIG. 15 illustrates a schematic block diagram of an apparatus WW00 in a wireless network (for example, the wireless network 300 shown in FIG. 3-5). The apparatus may be implemented in a wireless device or network node (e.g., wireless device QQ110 or network node QQ160 shown in FIG. 3). Apparatus WW00 is operable to carry out the example method described with reference to FIGURE VV and possibly any other processes or methods disclosed herein. It is also to be understood that the method of FIGURE VV is not necessarily carried out solely by apparatus WW00. At least some operations of the method can be performed by one or more other entities.

Virtual Apparatus WW00 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtainer unit WW02, Receiving Unit WW04, Transmitting Unit WW06 and Correlating unit WW08, and any other suitable units of apparatus WW00 to perform corresponding functions according one or more embodiments of the present disclosure.

As illustrated in FIG. 15, apparatus WW00 includes obtainer unit WW02, configured for obtaining a measurement configuration, a Receiving Unit WW04, configured for receiving a first reference signal, a Transmitting Unit WW06, configured for a transmitting a message comprising information based on the received first reference signal and Correlating unit WW08, configured for correlating the first received reference signal with the reference signal codes from the set of reference signal codes to identify a first reference signal code.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Finally, it should be understood that the invention is not limited to the embodiments described above, but also relates to and incorporates all embodiments within the scope of the appended independent claims.

The invention claimed is:

1. A method for operating a user equipment in a wireless network, the method comprising:
receiving from a network node, a measurement configuration indicating at least one of a set of reference signal codes and a time/frequency resource;
receiving a first reference signal using at least one of the set of reference signal codes and the indicated time-frequency resource;
correlating the received first reference signal with reference signal codes from the set of reference signal codes to identify a first reference signal code; and
transmitting a message comprising information based on the received first reference signal.

2. The method according to claim 1, wherein the message comprises an indication of the first reference signal code.

3. The method according to claim 1, wherein the first reference signal code is associated with a reference signal contributing most to a power of the first received reference signal.

4. The method according to claim 3, wherein each reference signal code of the set of reference signal codes is associated with at least one of:
a Sounding Reference Signal (SRS);
a Demodulation and Reference Signal (DMRS); and
a Cell Specific Reference Signal (CRS).

5. The method according to claim 1, wherein the message comprises an indication of the first reference signal code and the message is transmitted to the network node.

6. A user equipment, UE, comprising:
an antenna configured to send and receive wireless signals;
processing circuitry configured to:
receive from a network node, a measurement configuration indicating at least one of a set of reference signal codes and a time/frequency resource;
receive a first reference signal using at least one of the set of reference signal codes and the indicated time-frequency resource;
correlate the received first reference signal with reference signal codes from the set of reference signal codes to identify a first reference signal code; and
cause transmission of a message comprising information based on the received first reference signal;
a radio front-end circuitry connected to the antenna and to the processing circuitry, and configured to condition signals communicated between the antenna and the processing circuitry;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

7. The UE according to claim 6, wherein the message comprises an indication of the first reference signal code.

8. The UE according to claim 6, wherein the first reference signal code is associated with a reference signal contributing most to a power of the first received reference signal.

9. The UE according to claim 8, wherein each reference signal code of the set of reference signal codes is associated with at least one of:
a Sounding Reference Signal (SRS);
a Demodulation and Reference Signal (DMRS); and
a Cell Specific Reference Signal (CRS).

10. The UE according to claim 6, wherein the message comprises an indication of the first reference signal code and the message is transmitted to the network node.

* * * * *